Patented Oct. 9, 1923.

1,469,895

UNITED STATES PATENT OFFICE.

JOHN PARKS COE, OF HASTINGS-ON-HUDSON, NEW YORK, ASSIGNOR TO MORGAN & WRIGHT, A CORPORATION OF MICHIGAN.

METHOD OF PREVENTING TRANSMIGRATION OF VULCANIZING AGENT IN RUBBER.

No Drawing.    Application filed October 4, 1922. Serial No. 592,398.

*To all whom it may concern:*

Be it known that I, JOHN PARKS COE, a citizen of the United States, residing at Hastings-on-Hudson, county of Westchester, and State of New York, have invented a certain new and useful Method of Preventing Transmigration of Vulcanizing Agent in Rubber, of which the following is a full, clear and exact description.

This invention relates to a method of preventing transmigration of a vulcanizing agent in rubber, more particularly in the curing of one rubber stock against another one, such as when curing pneumatic tires on the so-called air bags.

One of the common ways of curing pneumatic tires is to mount the finished tire casing on an annular tube formed either of rubber or of rubber with a reinforcing material, which tube is inflated to a considerable pressure during the curing of the casing, the latter being surrounded on the outside by the usual mold or wrapping. These tubes are relatively expensive to make and their life is limited, as owing to the repeated heating they quickly deteriorate from over curing after being used a number of times and must be scrapped. The so-called air bottles used by tire repair men in repairing casings are also subject to the same deterioration.

It is well known that when two rubber stocks containing different proportions of a vulcanizing agent such as sulphur are placed in contact the vulcanizing agent tends to migrate from the stock containing the larger proportion thereof to the other one, this migration being greatly hastened or increased by heat, and even the presence of a small air gap between the two stocks cannot entirely stop the action. Hence, it is evident that if a stock free from or containing a less proportion of vulcanizing agent than the object to be vulcanized is used to make a form on which to cure such an object, the vulcanizing agent will migrate into the form during the curing operation and in a comparatively short time the stock of the form will become partially cured and incapable of reworking, or overcured and therefore weak, hard and worthless for its purpose, as the case may be. Due to a difference in the speed of the accelerators used or other conditions this transmigration of the vulcanizing agent may also occur in cases where the proportion of the vulcanizing agent is the same in both stocks.

An object of my invention is to lessen the cost of vulcanizing rubber articles.

Another object is to prevent transmigration of a vulcanizing agent when vulcanizing rubber stocks in juxtaposition.

Still another object is to provide a process by means of which the same rubber stock may be repeatedly used to make forms over which to vulcanize rubber articles without hardening or curing of the form stock.

For a detailed disclosure of the invention reference is had to the accompanying specification and claims.

A specific embodiment of the invention will first be described in which it is applied in the curing of pneumatic tire casings. A suitably compounded rubber stock, preferably one reasonably stiff but of good milling and tubing qualities and which contains no vulcanizing agent such as sulphur, is extruded from a dieing machine in the form of a tube of somewhat less diameter than the interior of the casing to be vulcanized, and cut into suitable lengths. A length of the tubing is then joined by lapping the ends, this operation being suitably accomplished by inserting a mandrel within one end and expanding the other end of the tube over the first end. The lapped ends may be firmly united by pressing or hammering over the mandrel and if desired may be reinforced by a wrapping of sheet stock, the mandrel being left in the finished tube. Before joining the ends of the tube a suitable air valve is connected thereto in the usual manner. The tube is then placed within the casing and inflated, thereby expanding it to closely fit the interior of the casing. As this expansion necessarily causes the tube stock to become somewhat thinner, the air valve is preferably provided with a nut by which the joint with the tube may be tightened as the stock becomes thinner. Previous to inserting the tube in the casing a suitable barrier for preventing transmigration of the vulcanizing agent is placed in position. This barrier may take various forms. It has been found that a coating of glycerin, glue, or a mixture of the two interposed between the casing and tube will effectively prevent transmigration of the sulphur, and this coating or layer may be relatively thin as long as care is taken to make it continuous at all points. The coating may be applied in any suitable manner as by brushing, spraying, or in any other manner which conditions may indicate, and may be used on the casing, the tube or both. In order to provide body to the coating any suitable finely divided solid may be added such as talc, mica, ferric oxide, carbon black, or any other solid which is not itself permeable to the vulcanizing agent used. If desired, a thin flexible layer or fabric may be inserted between the tube and casing, provided the fabric is given a coating of the glycerin, glue or any compound thereof, since the vulcanizing agent can pass through the interstices if the fabric alone is used. The use of glycerin is preferred because it is cohesive, clean, easily washed off after the curing operation, and has a high boiling point.

After the cure is completed, the tube is removed, the air valve taken out and the tube stock remilled and retubed. As the use of the aforementioned barrier prevents absorption of a vulcanizing agent from the casing by the tube, the tube stock does not cure and may be used repeatedly without deterioration, and owing to the manner in which it is made, the cost of manufacture of the tube for each curing operation is very low. However, it is evident that if desired a fabric air bag containing a rubber compound with little or no vulcanizing agent may be used since the barrier will also prevent the passage of the vulcanizing agent into the rubber in the air bag in this case as well, and the bag may therefore be repeatedly used. In the case of a fabric and rubber bag having a vulcanizing agent in the rubber the bag would be cured, as are the all rubber bags now in common use. In either case the use of my invention prevents absorption of additional vulcanizing agent by the bags and consequent overcuring.

While a specific embodiment of the invention has been described, it is evident that it is not limited in its use and may be applied to the air bags or air bottles used by repair men in repairing tire casings, and it is also of advantage for increasing the life of inner tubes while in service in tire casings, or in any case where it is desired to prevent the transmigration of a vulcanizing agent from one stock to another.

It is evident that the process may be varied considerably in detail without departing from the invention as set forth in the following claims:

Having thus described my invention, what I claim and desire to protect by Letters Patent is:

1. The method of preventing the transmigration of a vulcanizing agent between juxtaposed rubber stocks, which consists in interposing between them a medium impermeable to said vulcanizing agent.

2. The method of preventing the transmigration of a vulcanizing agent between juxtaposed rubber stocks, which consists in interposing between them a thin layer of organic matter impermeable to said vulcanizing agent.

3. The method of prevnting the transmigration of a vulcanizing agent between juxtaposed rubber stocks, which consists in interposing between them a layer of a fluent material which is impermeable to said vulcanizing agent.

4. The method of preventing the transmigration of a vulcanizing agent between juxtaposed rubber stocks, which consists in interposing between them in fluid form a thin barrier of organic matter in which said agent is insoluble.

5. The method of preventing the transmigration of a vulcanizing agent between juxtaposed rubber stocks, which consists in interposing between them a thin layer of a fluid material in which said agent is insoluble, said material including a poly-hydric alcohol.

6. The method of preventing the transmigration of a vulcanizing agent between juxtaposed rubber stocks, which consists in interposing between them a coating of glycerin.

7. The method of preventing the transmigration of sulphur in curing juxtaposed rubber stocks, which consists in disposing a sealing coat of glycerin between said stocks, and curing.

8. The method of preventing transmigration of a vulcanizing agent in curing tire casings, which consists in disposing a casing on a rubber-containing inflated bag, interposing between the two a thin layer of a material impermeable to said agent, and curing.

9. The method of preventing transmigration of sulphur in curing tire casings containing sulphur, which consists in disposing a casing on a rubber air bag free from sulphur, interposing between the two a thin layer of a fluent material embodying glycerin, and curing.

Signed at Hartford, county of Hartford, and State of Connecticut, this 28 day of September, 1922.

JOHN PARKS COE.